April 10, 1951   J. M. CROMLEY   2,548,201
FISHERMAN'S BAIT BOX
Filed June 21, 1948
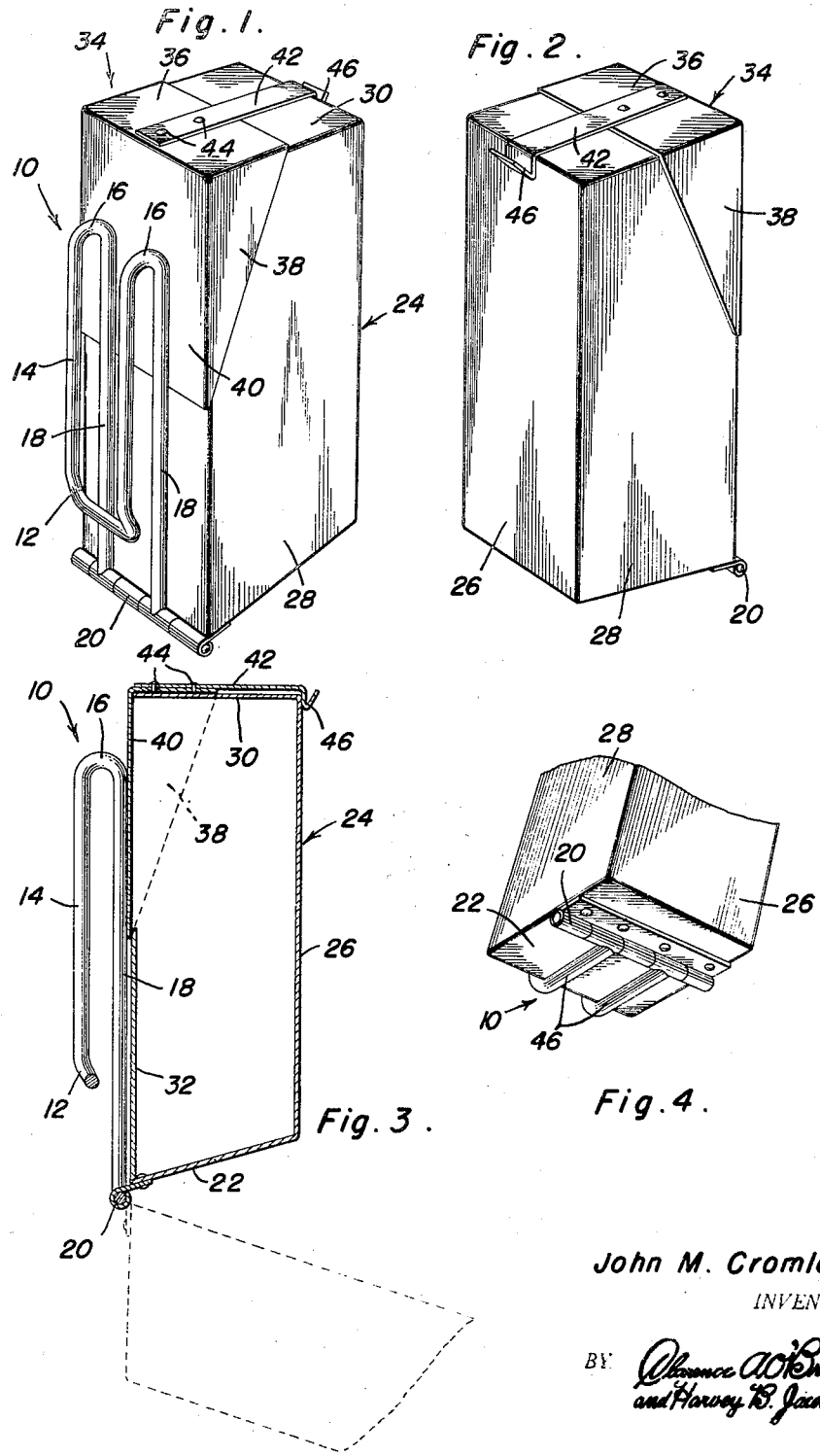
John M. Cromley
INVENTOR.

Patented Apr. 10, 1951

2,548,201

UNITED STATES PATENT OFFICE 2,548,201

FISHERMAN'S BAIT BOX

John M. Cromley, Lewisburg, Pa.

Application June 21, 1948, Serial No. 34,314

4 Claims. (Cl. 224—5)

This invention comprises novel and useful improvements in a fisherman's bait box and more specifically pertains to a novel and accessible container for bait together with an improved carrying and closure means for the same.

The principal object of this invention is to provide a bait box which may be easily attached to the garb of a fisherman for support thereon; which may be conveniently secured in its closed position and by a pivotal movement may be opened to give ready access to the bait therein; wherein the shape of the pivoted container is such that the fish bait such as worms or the like may be kept or stored in earth and upon opening movement of the container may be spread out in an easily accessible manner for the fisherman.

A further feature of the invention resides in the provision of a novel hanger adapted to be secured to the belt of the fisherman and having a hinge thereon for pivotally mounting a container, which container is provided with an opening in the upper walls of its upper end which is uncovered by the downwardly pivoting movement of the container and which is closed by a fixed closure carried by the hanger when the container is in its vertical position.

A further feature of the invention resides in the provision of a pivoted container forming a bait box as set forth in the preceding paragraphs, wherein the closure is provided with upper, side and top walls for embracing the ends, side and open top of the container in its vertical position, together with a resilient fastening clip carried by the closure for yieldingly engaging the under side of the container to retain the same in its closed or vertical position.

A still further feature of the invention resides in the provision of a container as set forth in the preceding features and objects, wherein the lower portion of the top wall of the container is provided with an integral closing member or partition, and wherein the upper portion of the top wall of the container is open to obtain access to the contents thereof; and further characterized by the provision of an inwardly and downwardly sloping lower wall for the container to assist in spreading out the earth and bait contained therein when the container is lowered to a substantially horizontal open position.

A still further feature of the invention comprehends the provision of a pivoted container for a fisherman's bait box wherein the hanger is provided with lower, bent terminal portions adapted to be hinged to and to support the lower sloping wall of the container when the latter is in its closed or vertical position.

And a final important feature and object of the invention is specially enumerated herein, resides in the provision of a fisherman's bait box wherein a pivoted container is mounted upon a hanger having a fixed closure member thereon, wherein the container and its closure are adapted to be constructed of light weight inexpensive sheet metal in an economical manner.

These, together with various ancillary features and objects of the invention which will later become apparent as the following description proceeds, are attained by this device, preferred embodiments of which have been illustrated by way of example in the accompanying drawings, wherein:

Figure 1 is a perspective view of one embodiment of bait box in accordance with the principles of this invention;

Figure 2 is a side elevational view of the embodiment shown in Figure 1;

Figure 3 is a vertical longitudinal sectional view of the embodiment of Figures 1 and 2, the open position of the container being indicated by dotted lines; and, Figure 4 is a fragmentary perspective view of the lower portion of a modified form of supporting hanger for the container.

Referring now more specifically to the accompanying drawings, wherein like numerals designate similar portions of the various views, attention is directed first to Figures 1-3 wherein the numeral 10 designates generally a hanger for supporting the device upon a portion of the garments of the fisherman, such as upon the belt or the like. This hanger may consist of any suitable construction and is conveniently formed of a single piece of wire or similar material, this wire being folded to provide a downwardly and inwardly turned loop portion 12 having vertically extending parallel legs 14 which are adapted to be disposed over and behind the belt of the fisherman. These legs 14 at the upper ends are provided with looped portions 16 and with parallel downwardly extending extremities 18 which at their lower ends are connected with a hinge of any desired construction indicated at 20. This hinge is suitably secured as by rivets, welding or the like to the lower end wall 22 of a container designated generally by the numeral 24 and which is pivotally mounted on the hanger by means of the hinge 20.

This pivoted container includes a flat bottom 26 together with side walls 28, an upper end wall 30, the above mentioned lower end wall 22, and a rigid and if desired an integral partial top or cover 32 extending from the end wall 22 towards the upper end wall 30 and partially overlying the bottom 26 in parallel relation thereto.

It will thus be seen that the container forms a generally rectangular substantially completely enclosed casing, except for the opening provided between the ends of the partition 32 and the upper end wall 30, which opening is adapted to provide access to the contents of the container.

The lower end wall 22 is preferably formed to slope inwardly and downwardly towards the bottom 26, as shown in Figure 3.

A fixed closure indicated generally by the numeral 34 is rigidly secured to the leg members 18 of the hanger 10, as by welding or the like, and this stationary closure includes a top end wall 36, triangular shaped side walls 38, and a top wall 40 by means of which the closure is secured to the above mentioned hanger legs 18.

The arrangement is such that when the container 24 is in its vertical or raised position, the open upper end thereof is received within the fixed closure 34 as shown in Figures 1 and 3, whereby the container is completely closed. When however the container is pivoted downwardly about the supporting hinge 20, as shown in dotted lines in Figure 3, the open top wall portion of the container is then exposed whereby access may be had to the contents in the interior thereof. It should be here noted that when the container is in the raised position shown in Figure 3, the mass of bait, the dirt in which the same is received are all disposed in the lower end of the container due to the vertical position of the latter. However when the container is lowered as in dotted lines in Figure 3, the sloping lower end wall 22 assists in causing the dirt and bait in the container to be spread outwardly and downwardly and more or less evenly across the floor of the container, thereby uncovering the bait from the dirt medium in the container and permitting easy removal of the bait by the fisherman through the uncovered opening in the container.

In order to assist in retaining the container in its raised, vertical or closed position, a spring catch is provided. For this purpose, a flexible strip 42 of any suitable resilient material is rigidly connected as by rivets 44 to the upper end wall 36 of the closure 34, and this resilient strip is provided with a flanged or bent portion 46 at its outer end which constitutes a catch and is adapted to overlie and yieldingly engage the bottom 26 of the container when in its raised position. The operation of this yieldable fastening or latching means will be readily understood and further explanation thereof is believed to be unnecessary.

Referring now to Figure 4, there is disclosed a modified construction wherein the hanger 10 which is of conventional construction has a lower end of the legs 18 turned inwardly as at 46 to underlie the end wall 22 of the container and serve as a supporting means therefor when the container is in its raised position. The ends of the portions 46 are secured to the previously mentioned hinge 20 which is suitably attached to the lower end wall 22 of the container. The operation of this form of the invention is identical to that set forth above, except that the hanger 10 serves to more intermittently support and secure the pivoted container, and to relieve the strain upon the edge when the container is in its raised and closed position.

From the foregoing, the principles of operation, the construction and advantages of the invention will be readily understood and further explanation is believed to be unnecessary.

However, since numerous modifications and changes will readily occur to those skilled in the art after a consideration of the foregoing specification and annexed drawings, it is not desired to limit the invention to the exact construction and arrangements shown and described, but all suitable modifications and equivalents may be resorted to, falling within the scope of the appended claims.

Having described the invention, what is claimed as new is:

1. A fisherman's bait box comprising a container having a bottom wall, end and side walls, and a top wall covering a portion of said container and defining an opening with the adjacent walls, a substantially U-shaped hanger hingedly connected to one of said end walls, a closure member carried by said hanger and covering said opening and means for resiliently locking said closure member to the other end wall.

2. The combination of claim 1 wherein the lower end wall of said container is inclined downwardly toward said top wall.

3. The combination of claim 1, wherein said closure has an end and side walls and an integral cover portion for embracing the upper end and sides of said container when the latter is pivoted into its vertical position.

4. The combination of claim 1 wherein said means includes a flexible strip secured at one end to said closure and having a resilient catch at the other end for engagement with said bottom wall.

JOHN M. CROMLEY.

REFERENCES CITED

The following references are of record in the file of this patent:

UNITED STATES PATENTS

| Number | Name | Date |
| --- | --- | --- |
| 1,072,022 | Miller | Sept. 2, 1913 |
| 1,314,392 | Glamzo | Aug. 26, 1919 |
| 1,484,399 | Kroha | Feb. 19, 1924 |
| 1,526,457 | Brooks et al. | Feb. 17, 1925 |

FOREIGN PATENTS

| Number | Country | Date |
| --- | --- | --- |
| 71,499 | Austria | June 10, 1916 |